United States Patent Office 3,036,948
Patented May 29, 1962

3,036,948
ADHESION OF POLYESTER FIBER DIRECTLY TO BUTYL RUBBER BY MEANS OF EPOXY RESIN
Arthur C. Danielson, Royal Oak, Mich., assignor to United States Rubber Company, New York, N.Y., a corporation of New Jersey
No Drawing. Filed June 4, 1959, Ser. No. 817,992
14 Claims. (Cl. 156—330)

This invention relates to the adhesion of butyl rubber to polyester fiber, and more particularly the invention relates to a method of effecting such adhesion by treating the fiber with a polyepoxide resin, compounding the butyl rubber for vulcanization with 2,2'-methylene-bis-(4-chloro-6-methylolphenol), and thereafter vulcanizing the butyl rubber composition in contact with the treated fiber. The invention also relates to the laminate thus obtained.

Polyester fiber of the kind represented by the commercially available material known as "Dacron" (condensation product of dimethyl terephthalate and ethylene glycol, Du Pont) has many desirable characteristics as a reinforcement for rubber articles. It has a very high tensile strength (nearly equal to nylon) which is necessary in such fabric-reinforced rubber articles as V-belts and air springs or oil springs. At the same time, it stretches even less than rayon, and therefore articles such as belts and springs reinforced with polyester fiber tend to maintain their dimensions better. The tendency of polyester fiber to absorb moisture is less than in the case of nylon and rayon, and this feature further improves the dimensional stability of articles reinforced with polyester fiber. Of paramount importance is the fact that the polyester fiber resists heat much better than nylon or rayon, and in this respect it is exceeded only by "Teflon" (polytetrafluoroethylene, Du Pont), a fiber of very low tensile strength.

However, in spite of the foregoing numerous advantages of polyester fibers, their use as a reinforcement for rubber articles such as pneumatic tires, belts, hose, air springs, and the like, has been seriously impeded because the adhesion of polyester fibers to elastomers is, in general, very poor. Apparently the polyester fiber is so inert chemically, compared to rayon and nylon which contain many more reactive groups in their chains, that there is little or no tendency for the polyester fiber to form a strong adhesive chemical bond with elastomers, when the usual adhesives are used. The problem of adequate adhesion of polyester fiber is especially important in the case of butyl rubber, which has many desirable characteristics that would enable composite articles, made of butyl rubber reinforced with polyester fiber, to serve many purposes in an improved manner. It is especially difficult to bond butyl rubber adequately to polyester fiber reinforcement.

Accordingly, the principal object of the present invention is to provide an improved way of adhering polyester fiber to butyl rubber.

Still another object is to provide an improved laminate of vulcanized butyl rubber, reinforced with polyester fibers.

It is still another object of the invention to provide improved "building tack" between polyester fabric and butyl rubber in the unvulcanized state in order to facilitate the assembly of composite articles, such as pneumatic tires, belts, and air springs, from such materials.

The invention is based on the unexpected discovery that remarkably improved adhesion is obtained, between butyl rubber and polyester fiber, provided that the butyl rubber is compounded for vulcanization with 2,2'-methylene-bis-(4-chloro-6-methylolphenol), and provided that the polyester fiber is treated with a polyepoxide resin.

The term "butyl rubber" is used herein in its conventional sense to refer to that low-unsaturation type of synthetic rubber made by low temperature copolymerization of isobutylene or its equivalent with isoprene or its equivalent. Sometimes this rubber is marketed in chlorinated or brominated form.

The polyester fiber or fabric employed in the invention is typified by the commercially available polyethylene terephthalate or its known equivalents (see, for example, U.S. Patent 2,465,319 issued to Whinfield et al. on March 22, 1949). The invention is also applicable to polyethylene terephthalate in other forms, such as the form of a film.

The 2,2' - methylene-bis-(4-chloro-6-methylolphenol) employed as the vulcanizing agent for butyl rubber in the present invention is a known material [Zinke and Hanus, Ber. 74B, 211–212 (1941)], and can be made as follows (all parts and percentages being by weight):

A clear solution is made by mixing together in the order shown with stirring 4880 parts of water, 410 parts of sodium hydroxide (assay 97%), 2690 parts of 2,2'-methylene-bis-(4-chlorophenol) (known commercially as "Dichlorophene") and 1780 parts of 37% formalin. This solution is heated at about 50° C. for about 22 hours and then is cooled to room temperature. Some of the sodium salt of the product precipitates. More is precipitated by adding 580 parts of sodium chloride to the rapidly stirred mixture. After a short time the mixture is filtered, the filter cake is slurried with water and refiltered. The second filter cake is rapidly agitated with 3000 parts of water at 50–55° C. and acidified with 20% acetic acid to a pH of 3.5 to 4.0 to form 2,2'-methylene-bis-(4-chloro-6-methylolphenol) as a very pale cream colored solid. It is filtered, washed three times by slurrying it in water and filtering, and dried in air. It melts at 138–140° C. with decomposition. (The melting point varies considerably from batch to batch of product, perhaps because of variations in the purity of the Dichlorophene or because of sensitivity of the product to minor variations in the way of taking the melting point. Sometimes, a melting point—or decomposition point—as high as 155° C. has been observed. Therefore, analysis of the product is a much more reliable test for purity than is the melting point.)

Analysis:

| | Calcd. for $C_{15}H_{14}O_4Cl_2$, Percent | Found, Percent |
|---|---|---|
| Carbon | 54.7 | 56.0 |
| Hydrogen | 4.3 | 4.3 |
| Chlorine | 21.5 | 21.3 |
| Methylol | 18.8 | 18.0 |

For purposes of the invention the butyl rubber is compounded with from about 2 parts to about 15 parts by weight, per 100 parts of butyl rubber, and preferably from about 4 to about 12 parts, of the 2,2'-methylene-bis-(4-chloro-6-methylolphenol). Other modifying or compounding ingredients may be present in the mixture of butyl rubber and the stated vulcanizing agent, if desired. Thus, fillers such as carbon black, clays, hydrated silica, whiting, or the like, may be present, as well as pigments and dyes, mold release agents, blowing agents, softeners or plasticizers, tackifying agents, etc.

In accordance with the invention, the polyester fiber is prepared for adhesion to the foregoing butyl rubber composition by applying to the fiber, usually in the form of a fabric, a polyepoxide resin, typically a saturated polyglycidyl ether of a polyhydric alcohol or a polyhydric phenol. In the case of the liquid epoxide resins, the fiber may be dipped or otherwise treated directly with the epoxide resin, but, more conveniently, such resin is applied in the form of a solution or dispersion, which may be applied to the polyester fabric in any suitable manner, such as by spraying or dipping. We prefer to use a water-soluble epoxide of the kind specified. An example of a commercially available resin of this kind is the water-soluble epoxy resin marketed under the name "Eponite 100" by the Shell Chemical Co. Such a resin is made by reacting a polyhydric alcohol (glycerol) with epichlorohydrin in the presence of alkali to yield an epoxy resin having an epoxy equivalent of 1.1 or more and a molecular weight between 300 and 900, as represented by the material identified as Polyether B in column 5 of U.S. Patent 2,752,269, Condo et al., June 28, 1956. "Eponite 100" is described in more detail in the Shell Chemical technical bulletin SC:57–19. It is about 90% soluble in water, the remainder being readily dispersible. Less preferably, we may use water-insoluble epoxy resins, such as "Epon 834" or "Epon 1001" of Shell Chemical. Such resins may be prepared by known methods, for example, as shown in Examples 1 to 4 of U.S. Patent 2,698,315, Greenlee, December 28, 1954. Typical resins of this kind are described in more detail in technical publication SC:54–46 published in 1954 by the Shell Chemical Co. "Epon 834" is there described as the epoxy resin having the structure:

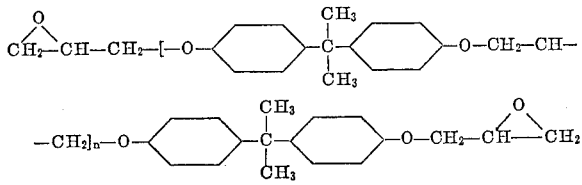

derived from bis-phenol A and epichlorohydrin. The resin is a liquid at ordinary temperatures, and has a Gardner color of 10 in 40% weight solution in butyl carbitol at 25° C., while the Gardner-Holdt viscosity of such solution is $A_2$–$A_1$, and the epoxide equivalent (grams of resin containing 1 gram-equivalent of epoxide) is 225–290. "Epon 1001" has a melting point of 64–76° C. by the Durran mercury method, a Gardner color of 8 (40% weight solution in butyl carbitol at 25° C.), a Gardner-Holdt viscosity of C–G and an epoxide equivalent of 450–525. In general, the polyepoxides suitable for use in the invention are those described in U.S. Patent 2,839,495, Carey, June 17, 1958, the disclosure of which is hereby incorporated herein by reference, to the extent that it describes the epoxy resins, particularly in the portion beginning at line 57 in column 6, and extending to line 74 in column 7. A particularly valuable description of the preferred water-soluble epoxy resins will be found in 2,752,269, as previously referred to. The resins disclosed in those patents may be substituted in the working examples below. They may be described as polyepoxides having a 1,2-epoxy equivalent of at least about 1.1. It is not necessary, for the present purposes, to employ a resinifying or curing agent for such resin.

The epoxy resin is suitably employed in the form of an aqueous solution or dispersion, although a dispersion or a solution is an organic solvent, such as acetone or toluene, may be used if desired. Usually the concentration of epoxy resin in such solution or dispersion will range from 1% to 50%, the exact concentration being immaterial. For purposes of the invention it is desirable to deposit on the polyester fabric from 0.2 to 5% of the epoxy resin, based on the weight of the fabric.

In a preferred aspect of the invention the water-soluble epoxy resin is dissolved in an artificial aqueous dispersion of butyl rubber, such as the commercially available butyl "latex," marketed by the Esso Corp. under the designation "MD–600–55." When the polyester fabric, such as a cord fabric or a woven fabric, is dipped into or otherwise impregnated with such a butyl latex containing the epoxy resin, and thereafter dried either at room temperature or at an elevated temperature (e.g., up to 130° C.), the resulting fabric has excellent building tack, that is, it can be applied to the raw vulcanizable butyl rubber stock and will remain adhered thereto during subsequent assembling or handling operations prior to the cure.

The assembly of polyester fabric bearing the epoxide resin deposit at least on its surface, and raw butyl rubber stock compounded for vulcanization with 2,2'-methylene-bis-(4-chloro-6-methylolphenol) may be assembled in any suitable conventional manner, depending upon the particular article that it is desired to construct. Thus, the vulcanizable rubber stock may be calendered or otherwise applied directly on to one or both surfaces of the polyester fabric, whether a woven fabric, or a cord fabric such as tire cord fabric. One or more layers of such calendered fabric may be plied up to make the desired article. Alternatively, sheets or other shapes of the vulcanizable rubber stock, prepared by calendering, milling, or pre-molding, or extrusion, etc., may be applied to the epoxy resin-treated fabric, or, conversely, the fabric may be applied to one or more surfaces of the rubber body.

After assembly, the polyester fabric-butyl rubber combination is then subjected to conventional vulcanizing conditions, usually while confined in a mold under pressure, frequently at a temperature of from about 125° C. to about 200° C. The time required to substantially complete the cure of the butyl rubber portion of the laminate will vary widely in practice, depending on such variables as the quantity of the curing agent employed, the temperature at which the process is carried out, the size of the article being cured, the type of apparatus employed, the exact qualities desired in the final vulcanizate, etc. In general, it may be stated that satisfactory curing times almost invariably fall within the range from about 2 minutes to 8 hours. It will be understood that the time required will in general be inversely related to the quantity of the vulcanizing agent contained in the mixture, and will also be inversely related to the temperature existing during the cure. Those skilled in the art will readily be able to determine suitable vulcanizing conditions to suit particular purposes, in accordance with conventional practice.

In the final cured laminate, the polyester fabric will be found to be adhered to the vulcanized butyl rubber with remarkable tenacity, through the medium of the deposit or interposed layer of epoxy resin composition. Hence, the service life of composite articles made in this manner will be far superior to that of a similar laminate in which the polyester fabric was not previously treated with epoxy resin and/or the butyl rubber was not cured with the specified 2,2'-methylene-bis-(4-chloro - 6 - methylolphenol). In this combination, there appears to be a unique interaction between the designated curative in the butyl rubber, and the epoxy resin on this particular fabric.

The following examples, in which all parts and percentages are expressed by weight, will serve to illustrate the practice of the invention in more detail.

EXAMPLE 1

Polyester cords (Du Pont "Dacron 59," polyethylene terephthalate) were dipped in aqueous solutions containing various concentrations of "Eponite 100" epoxy resin (described in more detail above) as shown in Table 1 below, and dried in air at room temperature.

The butyl rubber employed was the commercially available material known as "IIR–325," supplied by Esso Corp., which is a copolymer of about 97% isobutylene and about 3% isoprene. 100 parts of this rubber were mixed with 40 parts of carbon black, 1 part of stearic acid, 5 parts of hydrocarbon oil softener and 1 part of a resinous condensation product of 2,6-dimethylol-4-tertiary butyl phenol (phenolic resin "P–900" a curative and "low hysteresis" promoter for butyl rubber, employed here to improve the dispersion of carbon black and lower the hysteresis of the final vulcanizate), and such mixture was worked in an internal mixer for ten minutes at 350° F. (This pre-treatment exhausted the action of the phenolic resin on the butyl rubber; such pre-treatment with phenolic resin is optional.) The resulting mixture was then further milled with 3 parts of zinc stearate and 7 parts of 2,2'-methylene-bis-(4-chloro-6-methylolphenol) as a curative.

The polyester cords and the butyl rubber composition were then laminated and the assembly was then placed in a mold, and cured for 60 minutes in a press heated by steam under a pressure of 60 pounds per square inch. The cured laminates were removed from the mold, and subjected to two different adhesion tests. The first test, known as the "H" adhesion test is described in India Rubber World, 1946, vol. 114, pages 213–217, and 219, and was carried out at a temperature of 250° F., with the results noted in Table 1. The second test, known as the dynamic adhesion test, was carried out by curing a block of the butyl stock around the treated cord at its center. The cord was stretched and fastened at both ends, while the rubber block was vibrated a distance of 0.125" along the path of the cord until complete separation of the rubber from the cord occurred. This test was carried out at 150° F., and the results are noted in Table 1 as "Dynamic Adhesion" in terms of the duration of test before failure.

Table 1

| Percent Epoxy Resin in Treating Solution | 0 | 1 | 2 | 5 | 10 |
|---|---|---|---|---|---|
| "H" Adhesion (pounds) | 7.8 | 10.3 | 12.3 | 14.0 | 14.2 |
| Dynamic Adhesion (minutes) | 1 | 120+ | 120+ | 120+ | 120+ |

It will be apparent from the results shown in Table 1 that the presence of the epoxy resin in the polyester cord greatly increases the adhesion, especially under dynamic conditions. In contrast, repetition of this example using nylon in place of polyester cord produced no significant improvement in adhesion, whether the epoxy resin was present or not.

EXAMPLE 2

In this example the epoxy resin and the butyl rubber stock are the same as in Example 1. However, the epoxy resin is dissolved in an artificial butyl rubber latex known as "MD-600-55," supplied by Esso Corp., which contains 55% of butyl rubber solids (copolymer of about 1.4% isoprene and about 98.6% isobutylene) artificially dispersed in water. The latex was diluted with water to provide the concentrations of latex solids shown in Table 2 below. The concentrations of epoxy resin in the fabric treating composition are also shown in Table 2. The polyester cord was the same as in Example 1, and the method of procedure was the same in all detail as in Example 1. The results of adhesion tests on the laminates after cure are shown in Table 2.

Table 2

| Percent Latex Solids in Treating Solution | 10 | 7 | 5 | 3 | 0 |
|---|---|---|---|---|---|
| Percent Epoxy Resin in Treating Solution | 0 | 3 | 5 | 7 | 10 |
| "H" Adhesion (pounds) | 6.3 | 10.3 | 9.2 | 11.1 | 11.3 |
| Dynamic Adhesion (minutes) | 3 | 120+ | 120+ | 120+ | 120+ |

It will be observed that remarkably improved adhesion was obtained when the latex contained the epoxy resin. In addition, it was observed that the treating solutions including butyl rubber provided excellent building tack in the polyester cord, so that it could be stitched to the raw butyl rubber stock and would remain attached thereto firmly.

Repetition of Example 2, using nylon cord and rayon cord in place of the polyester cord, demonstrated that the epoxy resin does not produce significant improvement in the adhesion of nylon or rayon to butyl rubber compounded as described.

Repetition of Example 1 or 2 with butyl rubber compounded for sulfur vulcanization in the conventional manner does not produce the desired improvement in adhesion. Similarly, the substitution of 2,6-dimethylol-4-hydrocarbyl phenols, or their resinous condensation products, as curatives in place of the specified 2,2'-methylene-bis-(4-chloro-6-methylolphenol in Example 1 or 2 does not produce the desired results. In other words, it is necessary, in order to obtain the desired improvement in adhesion, to use the specified 2,2'-methylene-bis-(4-chloro-6-methylolphenol) as the vulcanizing agent for the butyl rubber.

EXAMPLE 3

Example 1 is repeated, except that in place of the epoxy resin, there are employed solutions of the commercial epoxy resins, "Epon 834" and "Epon 1001," described in detail above, in a mixture of acetone and toluene (50–50, by weight). Table 3 summarizes the results.

Table 3

| Percent "Epon 834" in Treating Solution | 0 | 1.0 | 3.0 | 0 | 0 |
|---|---|---|---|---|---|
| Percent "Epon 1001" in Treating Solution | 0 | 0 | 0 | 1.0 | 3.0 |
| Percent Solvent in Treating Solution | 100 | 99 | 97 | 99 | 97 |
| "H" Adhesion (pounds) | 5.7 | 6.7 | 7.0 | 7.1 | 8.7 |
| Dynamic Adhesion (minutes) | 72 | 120+ | 120+ | 120+ | 120+ |

It will be apparent that the adhesion is very much improved when the polyester cord is first treated with the epoxy resin solution.

EXAMPLE 4

In this example, test specimens of laminated butyl rubber-polyester fabric were constructed, and vulcanized for 70 minutes at 60 pounds steam pressure, in the shape of domes, and subjected to the dynamic test described in U.S. Patent 2,669,119, issued to E. B. Dodge on February 16, 1954. In some of the specimens, the polyester fabric received no treatment. In others, the fabric was treated with a 5% aqueous solution of Eponite 100, as in Example 1. In still other specimens, no epoxy resin was used, but the fabric was treated with butyl rubber latex alone, using the latex described in Example 2, without the epoxy resin additive. In all cases the butyl rubber stock was as described in Example 1. The results of the tests on a number of such samples are summarized in Table 4. In the table, the number of minutes that various samples ran before failure is recorded, as well as the maximum internal temperature developed during the test, together with the location of the failure.

Table 4

| Treating Solution | Minutes Run Before Failure | Maximum Temp. Developed, °F. | Location of Failure |
|---|---|---|---|
| None | 60, 75, 70 | 203 | Fabric rubber interface. |
| 5% Eponite 100 | 145, 165, 300+ | 224 | In rubber stock. |
| 15% Butyl Latex | 63, 95 | 308 | Fabric-rubber interface. |

It will be apparent that neither untreated polyester fabric, nor polyester fabric treated with butyl rubber latex, provided the long life before failure, obtained when the polyester fabric was treated with epoxy resin in accordance with the invention. Also, only the fabric treated in accordance with the invention yielded a bond of such strength that the failure occurred in the rubber stock, rather than at the rubber-fabric interface.

Having thus described my invention, what I claim and desire to protect by Letters Patent is:

1. A method of adhering a polyethylene terephthalate body to isobutylene:isoprene copolymer rubber comprising treating the polyethylene terephthalate body with epoxy resin, compounding the rubber for vulcanization with 2,2'-methylene-bis-(4-chloro - 6 - methylolphenol), thereafter laminating the body and compounded rubber with a surface of the rubber directly in contact with a surface of the body bearing the epoxy resin, and subsequently subjecting the laminate to vulcanizing conditions.

2. A method as in claim 1 in which the said epoxy resin is a condensation product of glycerol with epichlorohydrin.

3. A method as in claim 1 in which the said epoxy resin is a condensation product of bis-phenol with epichlorohydrin.

4. A method of adhering polyethylene terephthalate fiber to isobutylene:isoprene copolymer rubber comprising treating the fiber with an aqueous solution of water-soluble epoxy resin, drying the thus-treated fiber, compounding the rubber for vulcanization with 2,2'-methylene-bis-(4-chloro-6-methylolphenol), thereafter laminating the fiber and compounded rubber with a surface of the rubber directly in contact with a surface of the fiber bearing the epoxy resin, and subsequently subjecting the laminate to vulcanizing conditions.

5. A method as in claim 4, in which the said fiber is in the form of a cord fabric.

6. A method as in claim 4, in which the said epoxy resin is a condensation product of glycerol with epichlorohydrin.

7. A method of adhering polyethylene terephthalate fiber to an isobutylene:isoprene rubber body comprising treating the fiber with an aqueous composition comprising epoxy resin and dispersed isobutylene:isoprene copolymer rubber, drying the thus treated fiber, compounding the isobutylene:isoprene rubber, to which the fiber is to be adhered, with 2,2'-methylene-bis-(4-chloro-6-methylolphenol), thereafter laminating the fiber and compounded rubber with a surface of the rubber directly in contact with a surface of the fiber bearing the epoxy resin, and subsequently subjecting the laminate to vulcanizing conditions.

8. A method as in claim 7, in which the said epoxy resin is a condensation product of glycerol with epichlorohydrin.

9. A laminate comprising a polyethylene terephthalate body and isobutylene:isoprene copolymer rubber, the rubber being vulcanized with 2,2'-methylene-bis-(4-chloro-6-methylolphenol) and the said body being adhered directly to the rubber with an epoxy resin.

10. An isobutylene:isoprene copolymer rubber body reinforced with polyethylene terephthalate fiber, the rubber being vulcanized with 2,2'-methylene-bis-(4-chloro-6-methylolphenol) and the fiber having a deposit of epoxy resin thereon, whereby the fiber is firmly adhered directly to the rubber.

11. A body as in claim 10, in which the said epoxy resin is a condensation product of glycerol with epichlorohydrin.

12. A body as in claim 10, in which the said epoxy resin is a condensation product of bis-phenol with epichlorohydrin.

13. An isobutylene:isoprene copolymer rubber body reinforced with polyethylene terephthalate fabric, the rubber being vulcanized with 2,2'-methylene-bis-(4-chloro-6-methylolphenol) and the fiber having thereon a deposit comprising a mixture of isobutylene:isoprene copolymer rubber and epoxy resin, whereby the fiber is firmly adhered directly to the rubber.

14. A body as in claim 13, in which the said epoxy resin is a condensation product of glycerol with epichlorohydrin.

References Cited in the file of this patent

UNITED STATES PATENTS

| | | |
|---|---|---|
| 2,839,443 | Fleming | June 17, 1958 |
| 2,902,398 | Schroeder | Sept. 1, 1958 |
| 2,918,448 | Viohl | Dec. 22, 1959 |